May 7, 1935.  F. M. CARROLL  2,000,218
TABULATING MACHINE
Filed Sept. 29, 1928   14 Sheets-Sheet 1

Inventor
Fred M. Carroll
By his Attorney
Wm Wilson

May 7, 1935. F. M. CARROLL 2,000,218
TABULATING MACHINE
Filed Sept. 29, 1923 14 Sheets-Sheet 2

Inventor
Fred M Carroll
By his Attorney
W M Wilson

May 7, 1935.  F. M. CARROLL  2,000,218
TABULATING MACHINE
Filed Sept. 29, 1923  14 Sheets-Sheet 4

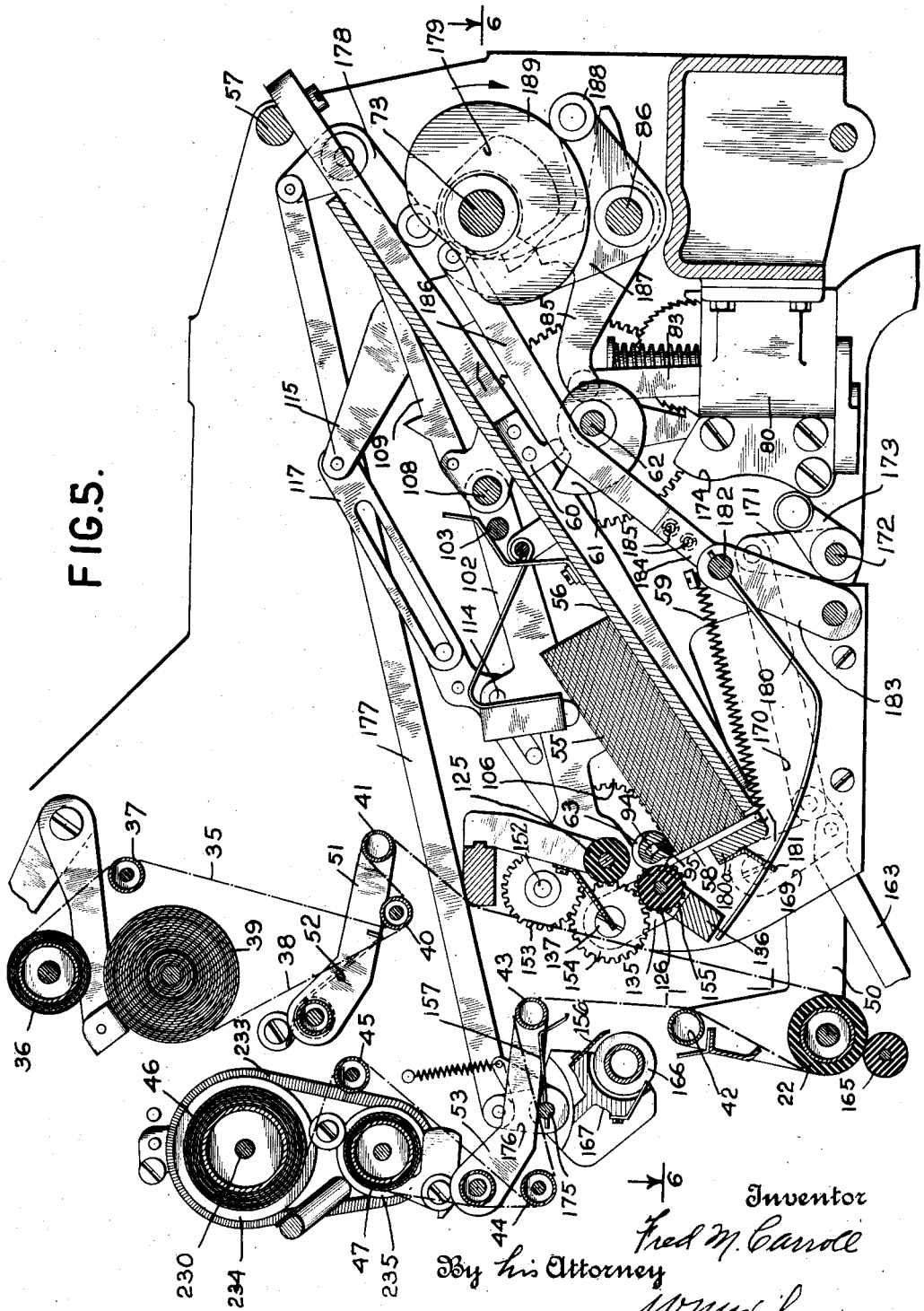

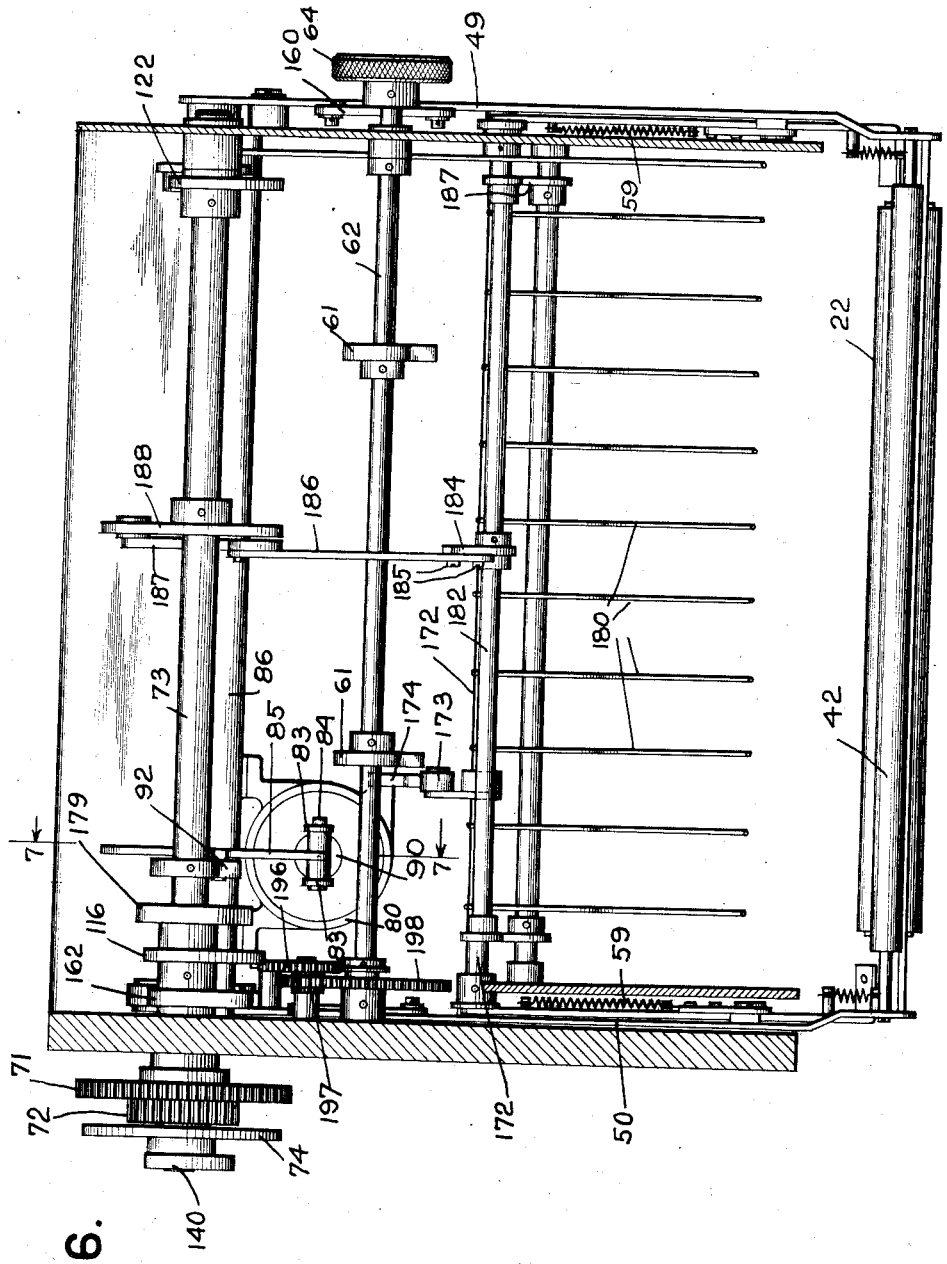

May 7, 1935.  F. M. CARROLL  2,000,218
TABULATING MACHINE
Filed Sept. 29, 1923  14 Sheets-Sheet 7
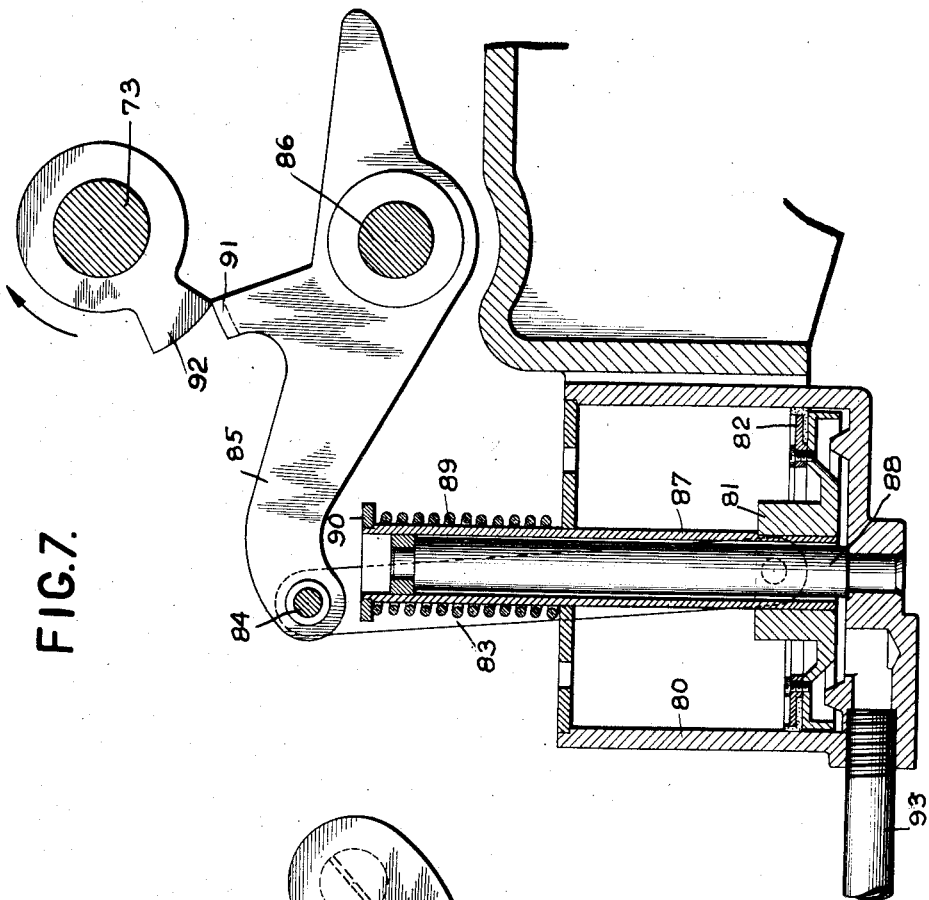
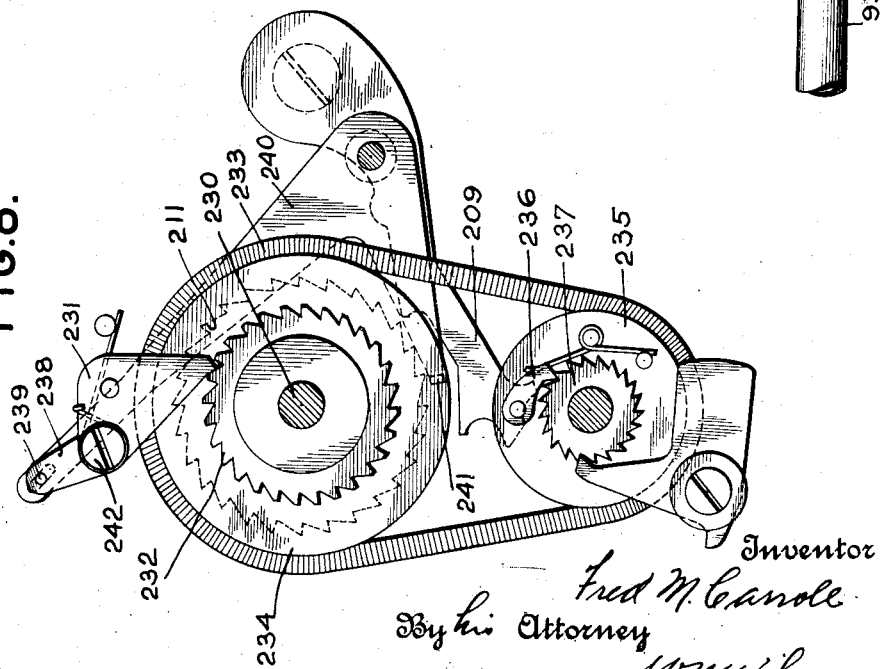

May 7, 1935.  F. M. CARROLL  2,000,218
TABULATING MACHINE
Filed Sept. 29, 1923  14 Sheets-Sheet 8
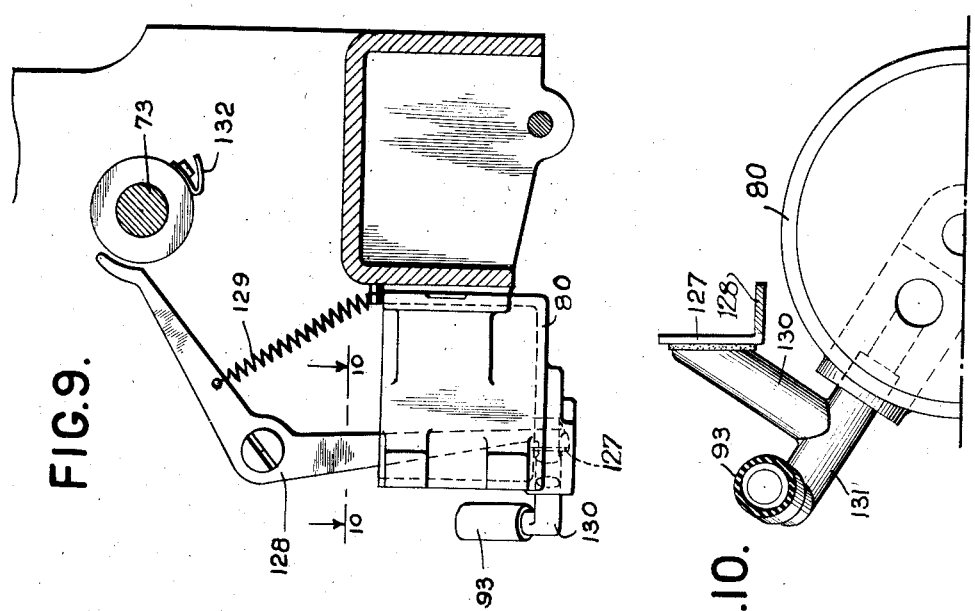
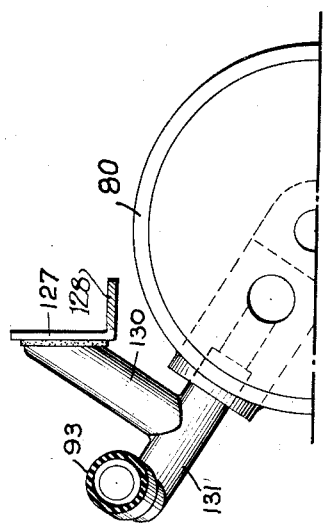
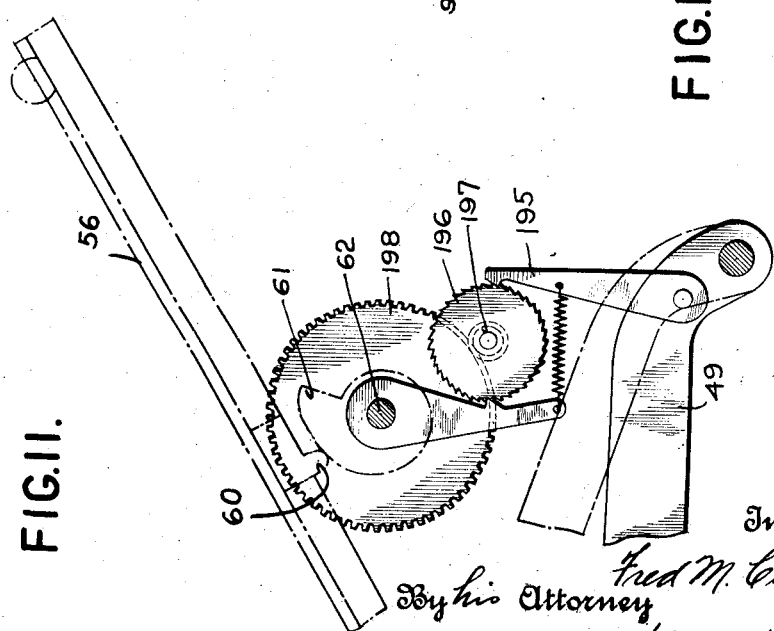
Inventor
Fred M. Carroll
By his Attorney
W M Wilson

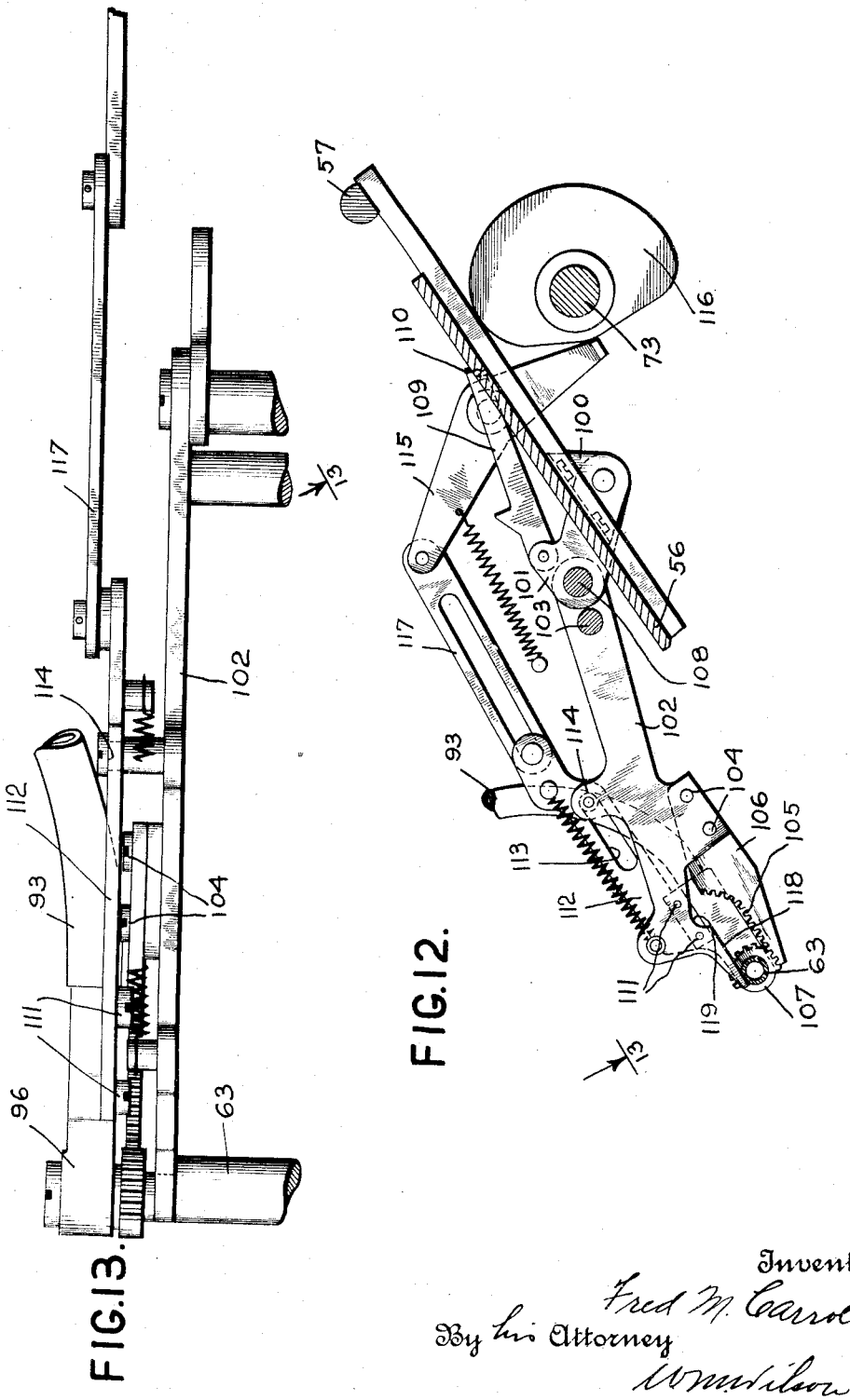

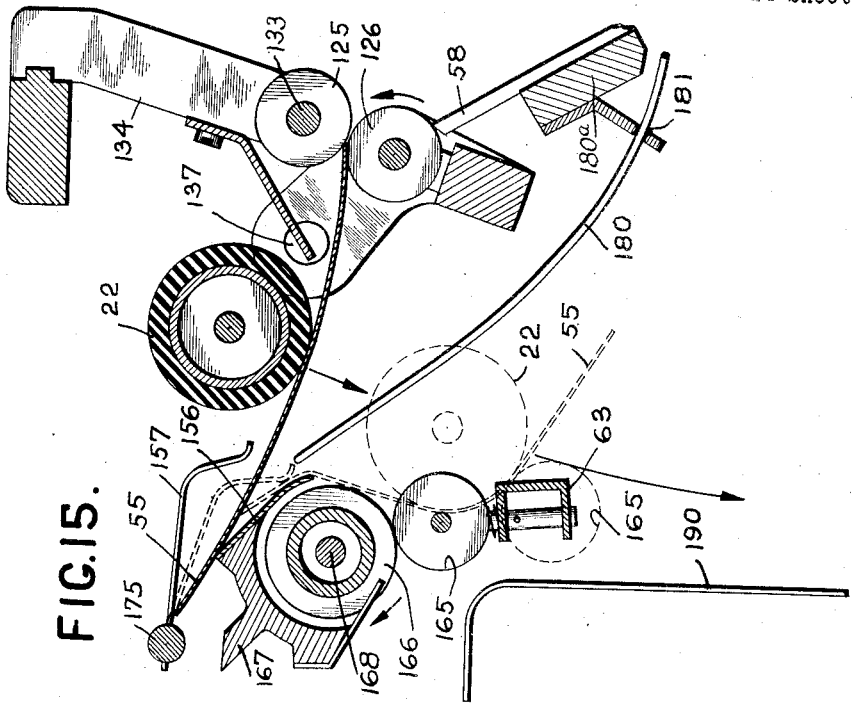
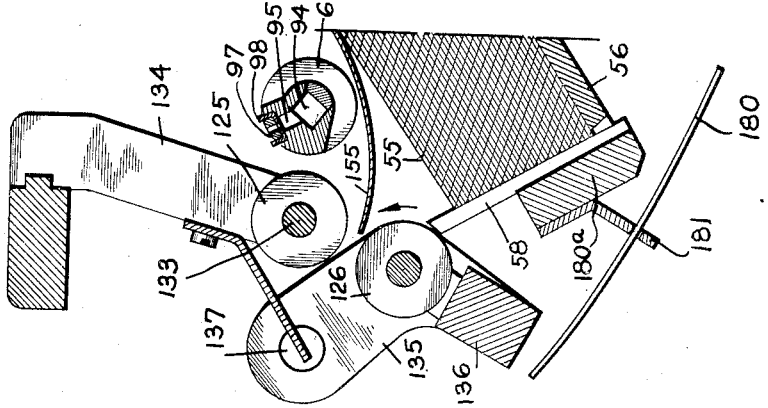
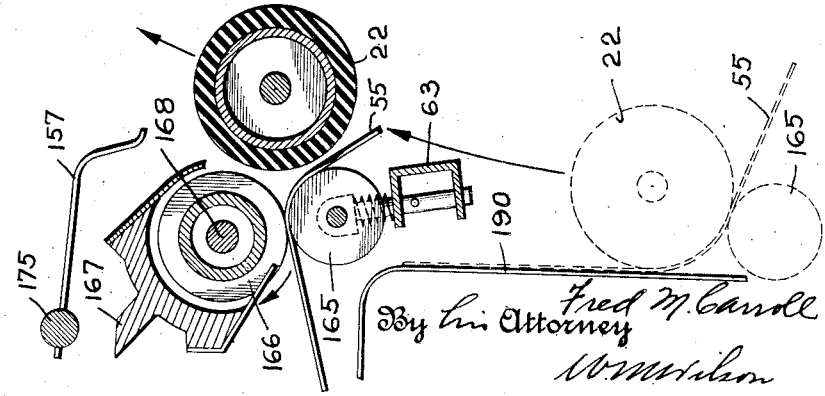

May 7, 1935. F. M. CARROLL 2,000,218
TABULATING MACHINE
Filed Sept. 29, 1923 14 Sheets-Sheet 11

Inventor
Fred M. Carroll
By his Attorney

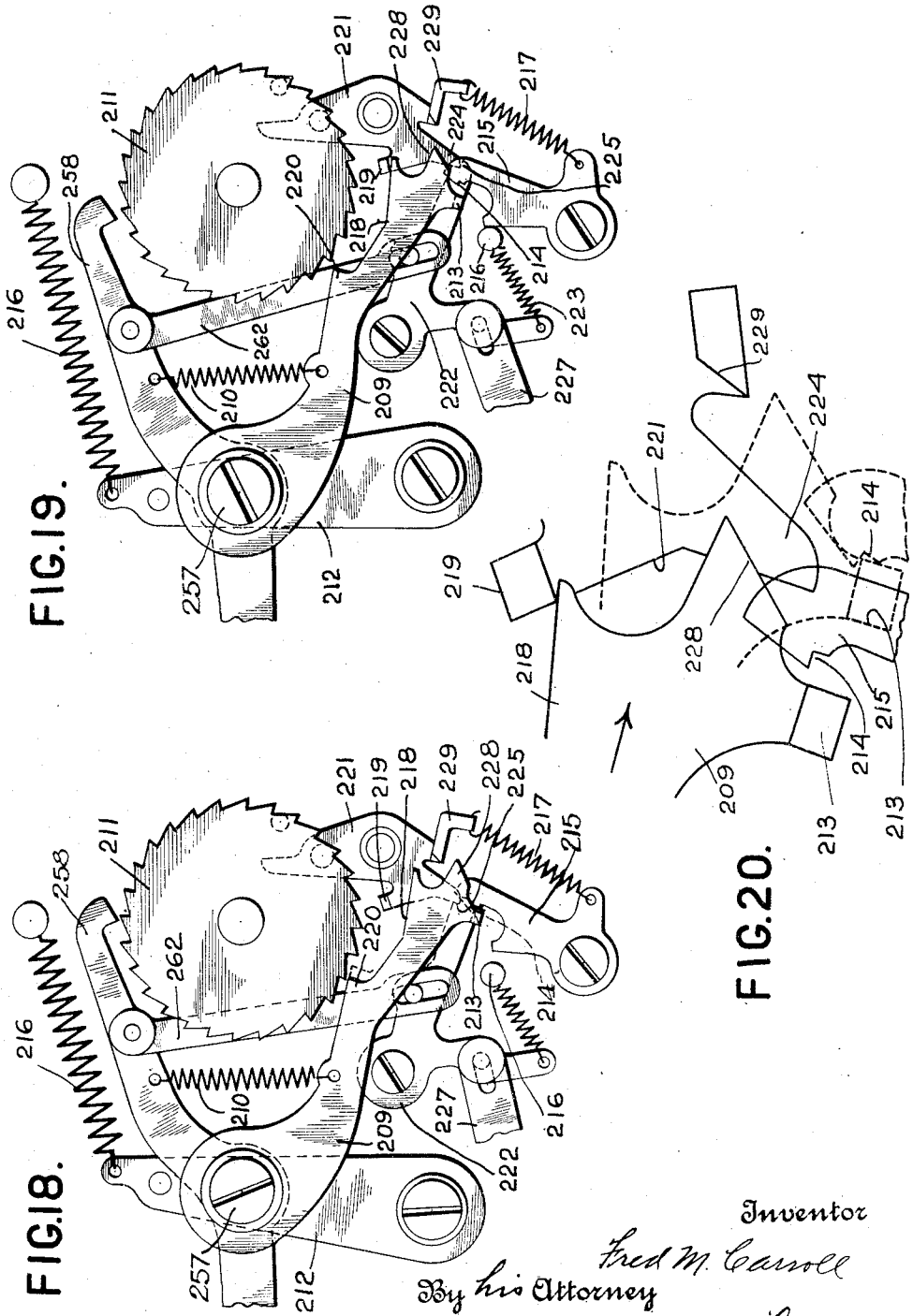

May 7, 1935. F. M. CARROLL 2,000,218
TABULATING MACHINE
Filed Sept. 29, 1923    14 Sheets-Sheet 13
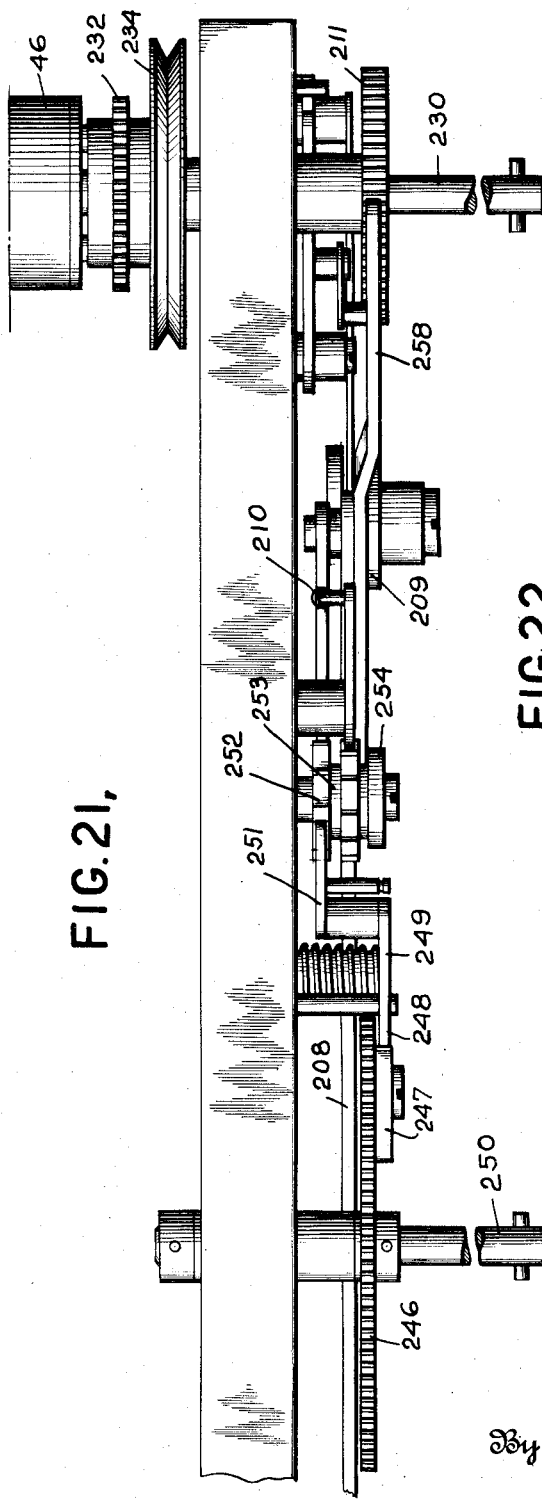
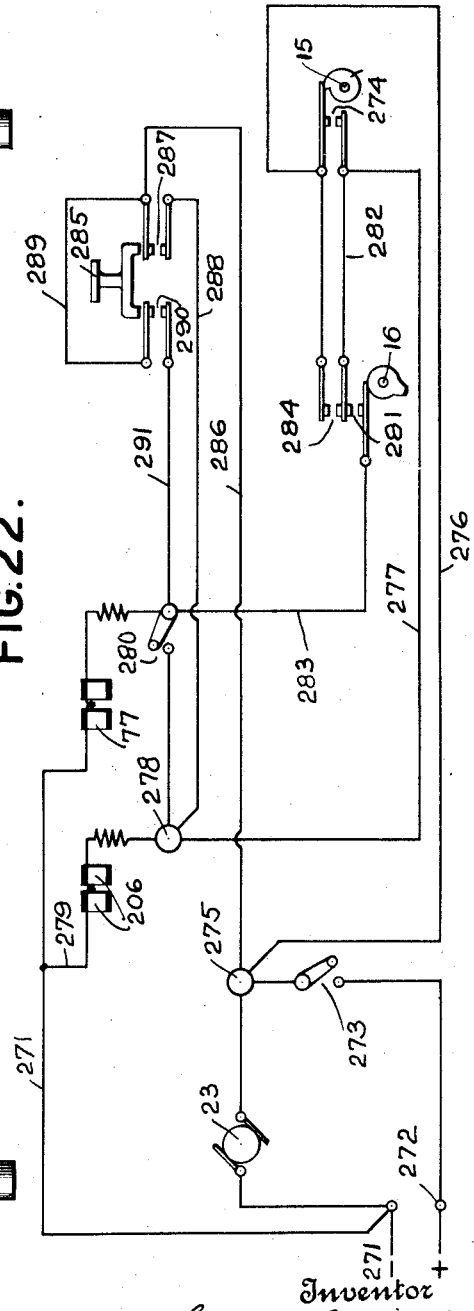
Inventor
Fred M. Carroll
By his Attorney Patented May 7, 1935

2,000,218

UNITED STATES PATENT OFFICE 2,000,218

TABULATING MACHINE

Fred M. Carroll, Yonkers, N. Y., assignor, by mesne assignments, to International Business Machines Corporation, New York, N. Y., a corporation of New York Application September 29, 1928, Serial No. 309,343

23 Claims. (Cl. 235—58)

This invention relates to accounting machines and more particularly to that type employing sheet feeding and printing mechanisms.

For the purpose of illustration the present improvements are applied to tabulating machines in which data comprising items is printed in accordance with perforated record cards and a total of such items is also printed upon the record receiving strip. While in given instances item and total printing on a record strip is sufficient for record purposes it is frequently desirable that the same information also appear upon loose sheets, bills, or the like which are preferably automatically presented to the printing mechanism to receive impressions simultaneously with the record strip.

It is therefore a broad object of the present invention to provide in combination with a machine adapted to print items, a sheet feeding means capable of removing an individual sheet or bill from a magazine stack and presenting it to a printing mechanism to receive the desired impression.

It is a further object of the present invention to incorporate such mechanisms in combination with a record strip printing mechanism whereby the same data may appear both upon the record strip and individual sheet.

It is a further object of the present invention to provide means for selectively controlling the sheet feeding mechanism to render it effective either as an incident to item or total printing. By the provision of suitable switching mechanism the improved machine may be conditioned to print a series of items upon a record strip and each item upon an individual and separate sheet, or by suitable adjustments the series of items and related total may appear upon both the record strip and an individual sheet.

Other control devices control optional operations of the record strip and sheet feeding mechanisms for the purpose of inspection, adjustment, etc.

In connection with the sheet feeding devices it is an object to devise such a construction that each sheet is positively held against accidental displacement either during the time it is being fed or held stationary for the purpose of printing, etc., which tends to minimize the possibility of the sheets passing into the working parts and disarranging the mechanisms.

The above object is preferably attained by providing a suction device which seizes the uppermost sheet of the magazine stack and presents it to a pair of feeding rollers which pass it on to be held and stopped by a suitable gripping device. Thereafter, the descent of a platen roller causes the sheet to be held between the platen and a cooperating roller, the gripping device being rendered ineffective to release its grip upon the sheet. The platen is then capable of presenting the sheet to the printing mechanism for the printing operation followed by the ejection of the printed sheet to the storage magazine by suitable ejecting mechanism.

It is a further object to construct and arrange the apparatus or attachment in such a manner that it is capable of being operated at high operating speeds and without imposing an extraneous load upon the machine to which it is attached.

To these and other ends the invention consists in the novel features of construction, arrangement of parts, and combination of elements hereinafter described and more particularly set forth in the claims:

In the drawings:

Fig. 5 is a central transverse sectional view of the machine showing the arrangement and cooperation of the sheet and paper strip feeding mechanisms;

Fig. 6 is a top plan view taken on the line 6—6 of Fig. 5;

Fig. 7 is a sectional view taken on the line 7—7 of Fig. 6 and illustrates the details of construction of the suction pump device;

Fig. 8 is a detail view in side elevation of the paper and carbon sheet rewinding mechanism;

Fig. 9 is an end view of the air entrance valve associated with the suction pump apparatus;

Fig. 10 is a partial plan view taken on the line 10—10 of Fig. 9;

Fig. 11 is a detail view of the sheet receiving table lifting mechanism;

Fig. 12 is a view in side elevation of a portion of the controlling mechanism associated with the suction tube device;

Fig. 13 is an enlarged plan view taken on the line 13—13 of Fig. 12;

Fig. 14 is a central sectional view of the major elements comprising the sheet feeding apparatus;

Fig. 15 is a view similar to Fig. 14 but shows the parts in operated positions;

Figs. 18 and 19 are enlarged views showing the relative position of some parts at different stages of operation;

Fig. 20 is a diagrammatic view also showing more clearly the relative position of some of the parts at a certain stage in the operation;

Fig. 21 is a plan view of the paper strip feeding apparatus and is taken on the line 21—21 of Fig. 16;

Fig. 22 is a diagram of the preferred electric controlling circuit.

For the purpose of illustration the present improvements are shown in connection with a Hollerith tabulating machine but it will be understood that with slight modifications they may be embodied in other forms of accounting machines and the present showing is to be considered as illustrative rather than restrictive.

The Hollerith type of tabulator is well known in the art and exemplified in many prior patents and requires but little further description than will be given incidentally herein. As is well known, as the perforated cards are passed through the machine, one or more counters are operated to show the figures or totals of the figures represented by the perforations in the cards.

The present improvements have been embodied in a tabulating machine of the type shown in the patent to Daly et al. #1,762,145 to which reference may be had for further details of construction and operation. However, in order to more clearly understand the invention, reference will be made to Fig. 23 which discloses a wiring diagram of the machine disclosed in this patent and illustrates the principal elements coordinated with the present improvements.

Figure 1:
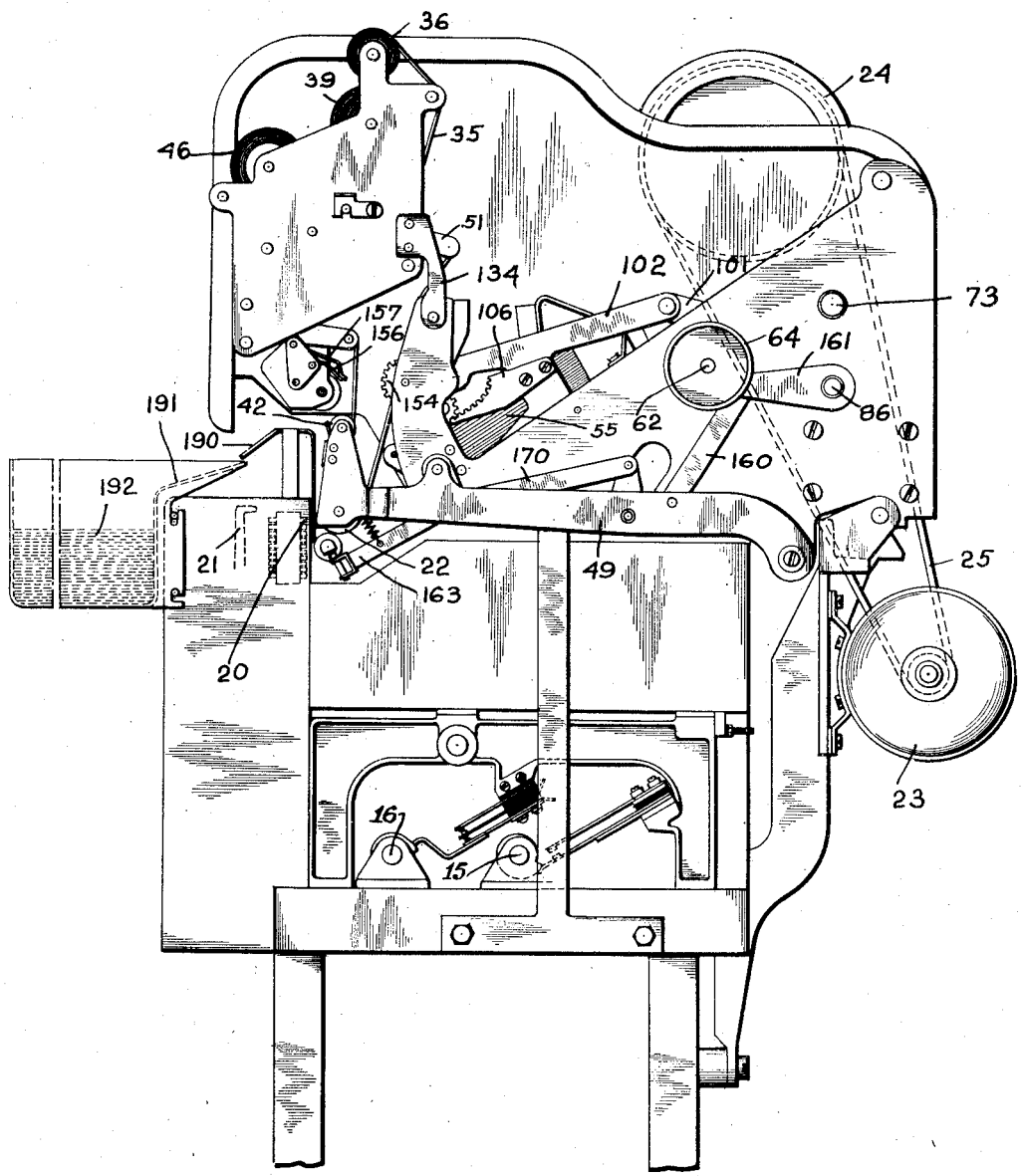
Fig. 1 is a view in side elevation of a conventional form of tabulator with the improved attachment associated therewith.
Figure 23:
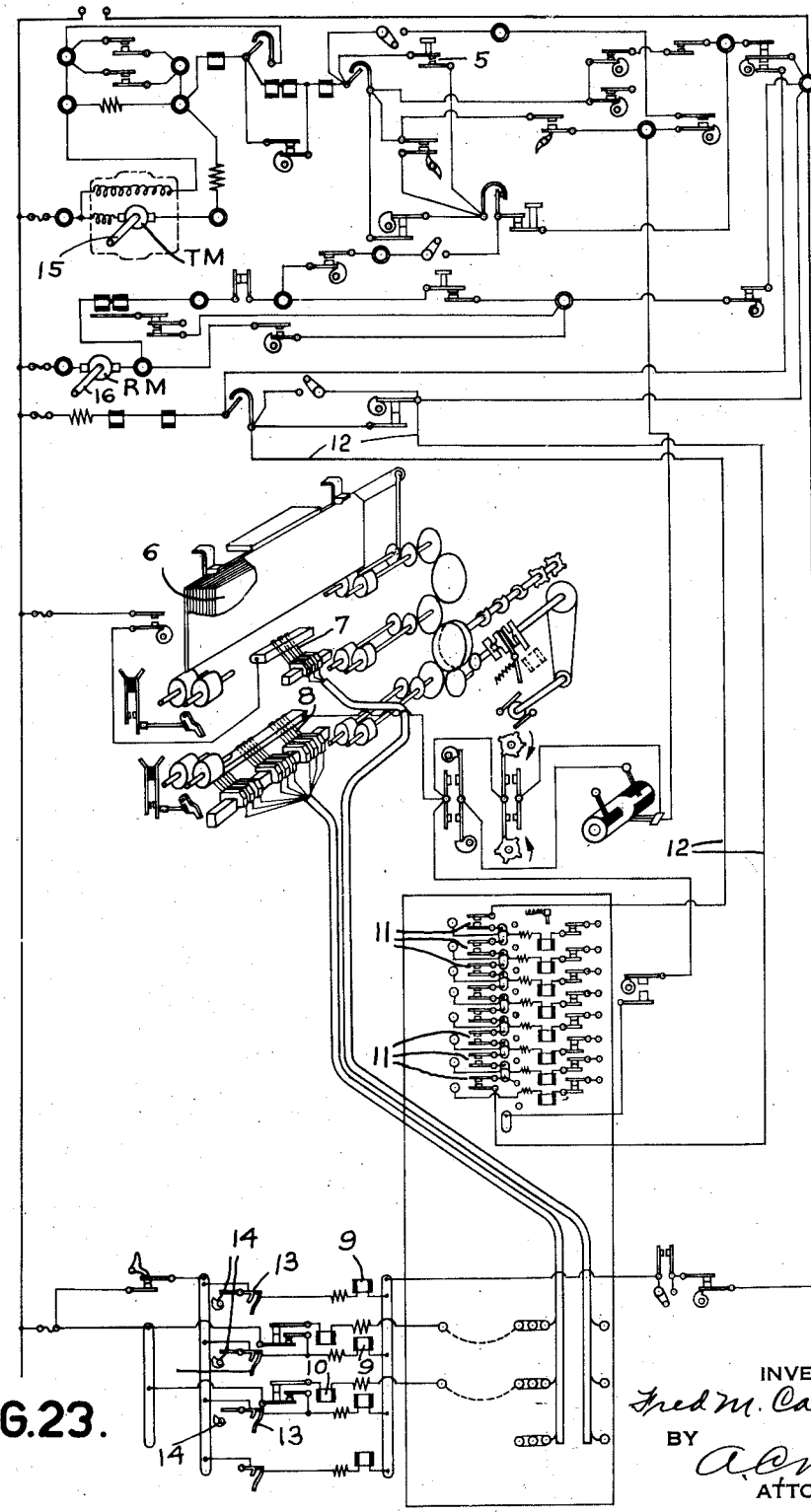
Fig. 23 is a wiring diagram of the tabulating machine to which the present improvements are applied.

As shown in Fig. 23 and more fully in the Patent #1,762,145 a tabulating motor TM is provided which, under control of a manually operated starting key 5, is adapted to be started thereby feeding by means of the usual card feeding devices tabulating cards 6 so that the perforations therein are analyzed by the upper or control brushes 7 and the lower or adding brushes 8. The lower brushes are adapted to be plugged so as to control the printing control magnets 9 and the adding control magnets 10. Printing control magnets 10 are adapted to selectively call the item type 20 (Fig. 1) into operation so that a plurality of such type, which comprise the printing mechanism, are adapted to print the items designated by the various controlling cards. When a series of such item printing operations are effected and when a change of group designation occurs which is sensed by means of the upper control brushes 7 in conjunction with the lower brushes 8, tabulating operations cease. Upon change in group classification one of the group control contacts 11 will open thereby opening a control circuit 12 which will stop the operation of the tabulating motor TM and automatically start the operation of the total and reset motor RM. During the resetting and total taking, contacts 13 will close at different points in the cycle depending upon the position of the stepped cam 14. The latter, as more fully described in the Patent #1,379,268 is adjusted under control of the adding elements controlled by the adding magnets 10. The closure of such contacts 13 will thereby energize the printing control magnet 9 at a certain point in the cycle of operation to thereby call a printing type in operation so that a plurality of type effect printing of the total of the items standing upon the accumulator elements. For the arrangement disclosed in Fig. 23, the printing elements selected for total printing operations comprise the same set so that total printing may be effected in the same column in which item printing operations are effected. During the item printing operations the listing shaft 15 (Fig. 1) is given an operation of a single revolution by the motor TM. The total taking shaft 16 is adapted to be operated after an item printing operation by the reset and total taking motor RM which is now effective and motor TM ineffective, or at rest.

Figure 2:
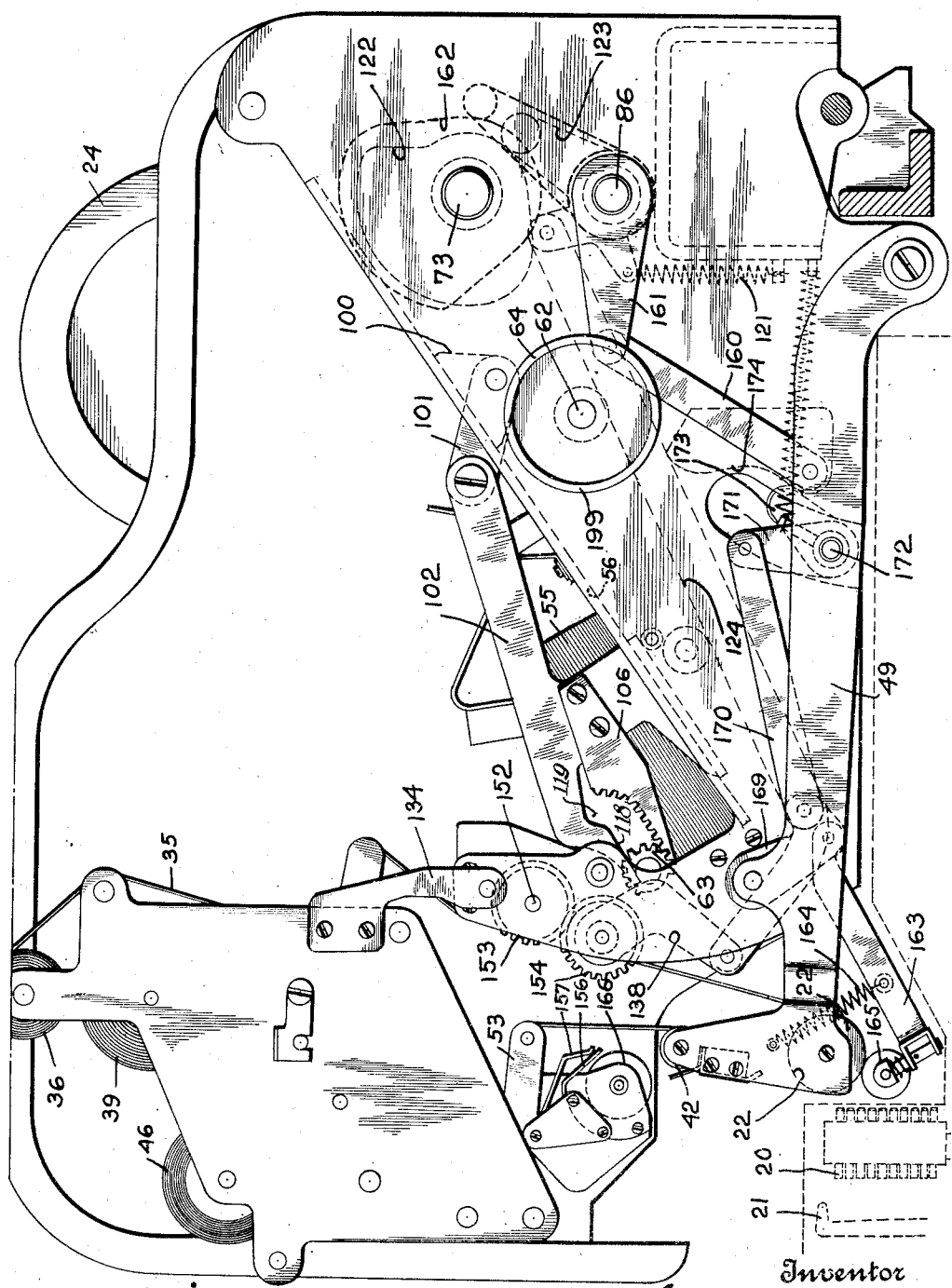
Fig. 2 is an enlarged view in side elevation of the upper portion of the machine disclosed in Fig. 1.

The printing devices whereby numerals corresponding to the perforations in particular card columns or the amount standing on any particular counter wheel are printed comprises a plurality of groups of type bars 20 (Fig. 2) any one of which may be impelled by suitable hammers 21 against a platen 22 to perform the printing operations. Inasmuch as the printing devices and the controlling devices therefor are not involved in the present application they are not shown in detail herein. For further details of construction reference may be had to the patent to C. D. Lake, Patent No. 1,379,268 dated May 24, 1921.

Power for driving the various mechanisms is provided by a motor 23 (Fig. 1) the driving shaft of which drives a belt pulley wheel 24 by a belt connection 25. The sleeve carrying the pulley wheel 24 carries a pinion 26 (Fig. 3) meshing with a gear 27 which in turn drives a pinion 27a, the latter having secured thereto a grooved pulley wheel 28. A belt 29 encircling the pulley wheel 28 transmits power to a pulley wheel 30, the belt passing around a fixed wheel 31 and the wheel 32 of a belt tightener.

The machine is adapted to print the data represented by tabulating record cards upon a record strip and upon individual sheets through the medium of an interposed carbon strip. The carbon sheet 35 (Fig. 5) is drawn from a supply roll 36 and passes over a fixed roller 37 while the record strip 38 is drawn from a supply roll 39. The record and carbon strips contact each other around a fixed roller 40 and thence pass around a tension roller 41, the platen 22, a fixed roller 42, a complementary tension roller 43, a fixed roller 44, at which point the strips diverge, the record strip passing around a fixed roller 45 to its storage roll 46 and the carbon strip passing directly from roller 44 to its storage roll 47. The aforesaid platen 22 is carried by a reciprocable frame comprising a pair of spaced pivoted arms 49 and 50 (Figs. 2, 5 and 6), the journal shaft of the platen 22 and the roller 42 being suitably journalled in the extremities of the arms.

For reasons to be fully explained hereinafter the platen supporting frame is reciprocated during each machine cycle and to take up any slack in the strips resulting from the upward movement of the platen 22 and to cause the strips to tightly surround the platen the tensioning rollers 41 and 43 are provided. The roller 41 is supported by a pair of spaced arms 51 (Fig. 5) and the arms 51 are urged upwardly by springs 52 to keep the strips taut as well as take up the slack produced. The roller 43 is carried by a pair of spaced arms 53 and biased by similar springs (not shown) and acts in cooperation with its complementary tension roller 41.

The individual sheets 55 (Fig. 5) heretofore mentioned are placed in stacked relationship upon an angularly disposed table 56 which is pivoted at one end by a rod 57 (Fig. 5). Secured to a fixed bar 180a is a stop plate 58 to provide for the proper positioning of the sheets 55. The table 56 is urged downwardly by a spring 59 and insures the engagement of projections of a pair of plates 60 with the periphery of a pair of spiral shaped profile cams 61 (see also Fig. 6) secured to an adjusting shaft 62. The shaft 62 is adapted to be given an increment of rotation during each machine cycle to raise the table correspondingly to insure that the uppermost sheet will be in contacting relationship with a suction gripper tube 63. For the purpose of manually positioning the table as an incident to the proper positioning of an initial stack of sheets an adjusting wheel 64 (Fig. 2) is secured to shaft 62. The means whereby the sheet carrying table is automatically positioned will be described hereinafter.

Rotatable with the constantly rotating gear 27 is a pinion 70 (Fig. 3) meshing with a driving gear 71 to which is secured a ratchet wheel 72 which forms one element of a clutch. Fast to a shaft 73 is a disk 74 carying a pawl 75 normally held as shown out of engagement with the ratchet wheel teeth against the action of a controlling spring by the engagement of the tail of the pawl 75 with a projection of an armature structure 76.

When a magnet 77 is energized the armature will be attracted to permit the engagement of the pawl with the ratchet wheel thereby causing shaft 73 to be rotated. When the tail of the pawl again strikes the projection of the armature structure the pawl 75 will be disengaged from the ratchet wheel teeth stopping the rotation of the shaft 73. Overthrow of the disk 74 at this time is effectively prevented by a pawl 78 engaging a shoulder 79 of the disk 74. The shaft 73 carries cams for operating the various mechanisms and its operability is controlled by the energization of the magnet 77 which is designated as the "sheet feed magnet" since it is energized as an incident to feeding individual sheets.

Shaft 73 operates a suction pump which causes the gripper tube 63 to seize the uppermost individual sheet and position it to be subsequently fed by a pair of feeding rollers. Fitting within a cylinder of a piston tube 80 (Figs. 6 and 7) is a piston plunger 81, sealing of the cylindrical wall being afforded by the provision of a sealing ring 82. A pair of links 83 connect the piston 81 with a cross shaft 84, the mid-point of which is received by the extremity of a crank arm 85 pivoted on a rod 86. Secured to the plunger 81 is a tube 87 within which fits a rod 88 secured to the piston tube base which is adapted to guide the plunger in its oscillating movement. A coil spring 89 encircling the portion of the tube 87 exterior of the casing has one end resting upon the top of the casing and the other confined by a washer 90 riveted to the upper end of the tube. The spring 89 is normally held compressed by the engagement of a lug 91 of the crank arm with the periphery of a cam extension 92 of a disk secured to shaft 73. Upon an initial operation of the shaft 73 the crank arm will be released by the disengagement of the cam extension 92 from the lug 91 whereupon spring 89 quickly elevates the plunger 81 exhausting the air within the cylinder and producing a suction in a tube 93 having an air connection to the bottom of the cylinder. At the termination of the cycle of operation of shaft 73 the cam extension 92 will again engage lug 91 to depress the plunger and latch it in the position shown in Fig. 7.

The suction gripper tube 63 is provided with a central longitudinal aperture 94 (Fig. 5) and a series of radial holes 95 having a fluid connection therewith. The longitudinal aperture 94 is sealed at one end but the other end has a fluid registration with the bore of the hose or tube 93 by a coupling member 96 (Fig. 13). As best shown in Fig. 14 the apertures 95 are restricted to a smaller bore by means of a perforated cross plate 97 which retains in place an apertured or similarly perforated sealing gasket 98. This construction provides an air-tight gripping device which firmly seizes the individual sheets.

Pivotally mounted on a pair of brackets 100 (Figs. 2 and 12) attached to the underside of the table 56 are a pair of arms 101 each of which has pivoted thereto its respective plate 102 of irregular shape. The plates 102 are pivoted on arms 101 by a rod 103 and are connected by a tie rod 103 and each has secured thereto by screws 104 a rack plate 106 having a series of rack teeth 105 which are partly arcuate and which mesh with a mutilated gear 107 integral with the opposite ends of the suction tube 63. It will be clear that if the tube 63 is drawn rearwardly the mutilated gears 107 rolling over the racks will result in a path of movement of tube 63 determined by the pitch line of the rack teeth. Any tendency of the plates 102 to move rearwardly during this operation and to pivot about the rod 108 is effectively prevented by a locking arm 109 having a shoulder 110 engaging a shouldered recess of table 56. Secured to the coupling member 96 (Fig. 13) by screws 111 is a plate 112 having an elongated guide slot 113 receiving a guiding pin 114 secured to plate 102. A bell crank arm 115 operated by a cam 116 secured to shaft 73 is connected to the plate 112 by a link 117. The plate 102 is provided with an overhanging portion having a straight guiding edge 118 and a recess 119 which guide the tube 63 when it is moved straight rearwardly and then in an arcuate direction.

When the shaft 73 is partially rotated the suction produced will cause suction tube 63 to firmly seize the uppermost sheet 55 so that subsequently the cam 116 will give a combined movement of translation and rotation to the suction tube resulting in the positioning of the end of the sheet 55 between a pair of feeding rollers 125 and 126 which are normally separated (see Fig. 14). When the sheet is properly positioned in the manner shown it is desirable to have the suction tube release its grasp on the sheet and to this end a relief valve 127 (Figs. 9 and 10) is provided. This valve is carried by one arm of a bell crank lever 128 and is urged by a spring 129 so that the valve plate 127 effectively closes a port hole of a tube 130 having an entrance to a connecting nipple 131. At a certain point in the rotation of a disk secured to shaft 73 a bent plate 132 will strike one arm of the bell crank 128 and rock the same to disengage the valve plate 127 from the port hole, admitting air and destroying the suction.

At about this time the rollers 125 and 126 close upon each other and are effective to feed the sheet further. The roller 125 (Fig. 14) is carried by a journal shaft 133 carried by a pair of spaced depending arms 134. The roller 126 is carried by a frame comprising a pair of arms 135 and a cross rod 136, the frame being dependently pivoted by a rod 137, permitting the frame to be rocked from its normal position (Fig. 14) to the position shown in Fig. 15. To accomplish this, secured to the frame 135, 136 is an angular shaped plate 138 (Fig. 2) which is connected to one arm of a bell crank 123 by a bent link 124. The bell crank 123 is pivotally mounted upon the rod 86 and has a roller engaging the profile of a cam 122 secured to shaft 73. A spring 121 insures that the roller follows the profile of the cam 122.

At the proper point in the machine cycle the rollers 125, 126 will be brought together to thereby feed the sheet which has been placed therebetween by the suction tube 63. To drive the rollers 125, 126 the following mechanism is employed.

Secured to the shaft 73 is a profile cam 140 (Fig. 3) engaging a follower secured to one arm of a bell crank 141 which has a link connection 143 to a segment 142. When the segment is initially rocked by the cam 140 it drives a pinion 144 and a disk 145 attached thereto. The disk 145 carries a pawl 146 adapted to engage one of a series of notches in a wheel 147 secured to a gear 148 both of which are loosely mounted on a stud 150. Gear 148 meshes with a pinion 151 secured to a shaft 152 which has at its end a gear 153 (Fig. 5) meshing with a similar gear 154 the latter in turn being in continuous mesh with a gear 155 secured to the feeding roller 126. The gear 154 is loosely carried by the pivot rod 137 of the frame 135, 136 so that when as the roller 125 is positioned to contact roller 126 the roller 125 will be driven by means of gears 153—154—155. As rollers 125, 126 grip the individual sheet 55 the rollers will subsequently be rotated to feed the sheet to the position shown in Fig. 15 wherein it will be observed that the sheet is now below the elevated platen roller 22 and the end thereof between a fixed plate 156 and a plurality of gripping fingers 157. As the normal position of the platen is at the printing line means are further provided to elevate it to its extreme upward position and then downwardly so that the sheet may be rolled about the platen roller to accomplish a subsequent printing operation. It will be recalled that the platen roll supporting frame is pivotally mounted by the arms 49 and 50 and pivoted to the arm 49 is a link 160 (Fig. 2) which is connected to one arm of a bell crank member 161 pivoted upon rod 86 and having a follower engaging the profile of a cam 162 secured to the driving shaft 73. Also pivoted to the platen roller frame is an auxiliary frame 163 (Fig. 2) urged upwardly by a spring 164 to provide a normal rolling contact between the platen roller 22 and a series of spring urged rollers 165 carried by the frame 163.

As the cam 162 elevates the frames carrying the associated contacting rollers 165 and 22 both will travel along an arcuate path and at a certain point in the travel of roller 165 it will strike a continuously rotating roller 166 (Fig. 14) and since the frame 163 will now be stopped against further movement spring 164 will be tensioned. The platen roller supporting frame now continues to rise and occupy a position above the sheet 55 subsequently fed. By reason of the construction shown it is necessary to cause the lowermost or smaller roller 165 to be urged ahead of the platen roller so that while the latter escapes contact with the roller 166 the roller 165 will contact therewith. To this end the arms comprising frame 163 are pivotally supported by a pair of depending arms 169 (Fig. 5) carried by respective side arms 49 and 50. A link 170 joins one of the arms 169 with an arm 171 secured to a rock shaft 172 (Fig. 5) which has secured thereto an arm 173 having a follower in engagement with the profile of a fixed cam plate 174. The cam outline is such that it urges the roller 165 ahead to contact the roller 166 when the platen roller supporting frame is elevated (see Fig. 14). The continuously rotating roller 166 is carried by a stationary frame member 167 (Fig. 5) and its supporting shaft 168 has fixed thereto the pulley wheel 30 (Fig. 3) which it will be recalled also rotates continuously.

The subsequent operation of the machine comprises the gripping of the end of the individual sheet 55 by the gripping wires 157 (Fig. 15). A number of these wires are carried by a rod 175 (Fig. 5) to which is secured an arm 176 having a link connection 177 to a bell crank member 178 the latter having a follower in engagement with a cam 179 secured to the driving shaft 73. At a definite point in the operation, which is when the sheet is positioned between the plate 156 and fingers 157, the latter will bear down upon the sheet and hold it firmly so that as the platen roller descends the sheet will be gripped between the platen roller 22 and roller 165.

To insure that the sheet will be fed properly between the wires 157 and plate 156 the following mechanism is employed. This comprises a plurality of curved wires 180 constituting a grid (Figs. 5 and 15) which individually pass in slots formed in a guide plate 181 which is carried by a fixed bar 180a. The ends of such wires are fixed in radial holes formed in a rod 182 loosely journalled in a pair of spaced arms 183. Secured to rod 182 (Figs. 5 and 6) is an arm 184 to which is fastened by screws 185 a link 186 pivoted to one arm of a bell crank 187 pivoted on rod 86 and having a follower 188 cooperating with a cam 189 secured to shaft 73. As the cam 189 operates the shaft 182 will be rocked and moved forwardly causing the wires of grid to rise and occupy the position shown in Fig. 15 thus guiding the individual sheet 55 to the proper place. The grid is of course, reversely rocked prior to the descent of the platen roller 22 which operation now ensues in the cycle of events.

The sheet, at this time, is firmly held by wires 157 so that as the platen roller descends the sheet will occupy the dotted line position shown in Fig. 15. Prior to the time the platen roll 22 contacts roller 165, the latter will have been brought out of contacting relationship with the continuously rotating roller 166 and when rollers 22 and 165 contact, the sheet 55 will be firmly held therebetween and wires 157 will now release their hold upon the sheet. Both of the rollers 22 and 165 now descend to position the sheet to the dotted line position shown in Fig. 14. As the strip 38 surrounding the platen is at the printing line the printing impression will cause the original impression to be made upon the sheet by means of the usual inking ribbon (not shown) and a duplicate copy upon the record strip 38 by means of the carbon copy sheet 35 interposed between the sheet 55 and record strip.

The sheet is then fed out to the storage magazine but this operation occurs during the initial operation of the subsequent machine operation.

If a sheet should be between the rollers 22 and 165 as they are initially elevated, that particular sheet will be ejected as an incident to the contact of rollers 165 and 166 (see Fig. 14). The sheet is then fed over a plate 190 (Fig. 1) down an inclined plate 191 to a magazine stack 192.

As premised hereinbefore the table 56 is lifted slightly as an incident to feeding a sheet in order to bring the uppermost sheet in contacting relationship with the suction gripper tube 63. The preferred mechanism is best shown in Figs. 6 and 11 wherein it will be observed that pivotally carried by the platen roller supporting arm 49 is a pawl 195 (Fig. 11) in operative relationship with a ratchet wheel 196 to which is secured a pinion 197 meshing with a gear 198 on a shaft 62 to which is affixed the previously mentioned pair of cams 61. Upon the descent of the platen frame, pawl 195 will rotate ratchet wheel 196 slightly, and by means of the low ratio gear train 197—198, the table 56 will be elevated slightly by cams 61.

The devices for actuating the paper strip feeding mechanism are under the combined control of a cam 205 (Fig. 16) and a paper strip spacing magnet 206. The cam 205 is secured to the stud shaft 70 carrying the constantly rotating gear 27 and cooperates with a follower carried by one arm of a bell crank member 207 to which is secured a link member 208 having pivoted thereto by a stud 257 an actuating pawl 209 which is urged upwardly by a spring 210 to engage the teeth of a ratchet wheel 211. The end of link 208 opposite its pivotal connection to bell crank member 207 is supported by an arm 212 and in the normal position of the parts shown in Fig. 18 pawl 209 is locked in its ineffective position out of engagement with wheel 211 by the engagement of a lug 213 of the pawl 209 with a shoulder 214 of a latching pawl 215. When the link member 208 is retracted against the action of a spring 216 the pawl 209 will follow, the engagement of the lug 213 with shoulder 214 continuing until the pawl 215 strikes a stop 216, said pawl being urged against the stop by a connected spring 217. Pawl 209, however, continues to move to the left and as it leaves the shoulder 214, an upper straight edge 218 will engage and ride under a lug 219, as shown in Fig. 19. For the present lug 219 may be considered relatively fixed as an incident to each non-spacing operation, so that as the cam 205 urges the pawl 209 back towards its normal position it will re-engage the shoulder 214 of pawl 215 to be subsequently held in its normal and lowermost position.

The engagement of a shoulder 220 of the pawl 209 with a ratchet wheel tooth when the pawl is fully retracted as shown in Fig. 19 is under the combined control of supplementary pawls 221 and 222. Each pawl 221 and 222 is pivoted and held against movement by their connected springs 217 and 223 respectively, by the engagement of a tail 224 of pawl 221 with a shoulder 225 of pawl 222, thus retaining lug 219, relatively fixed.

Figure 16:
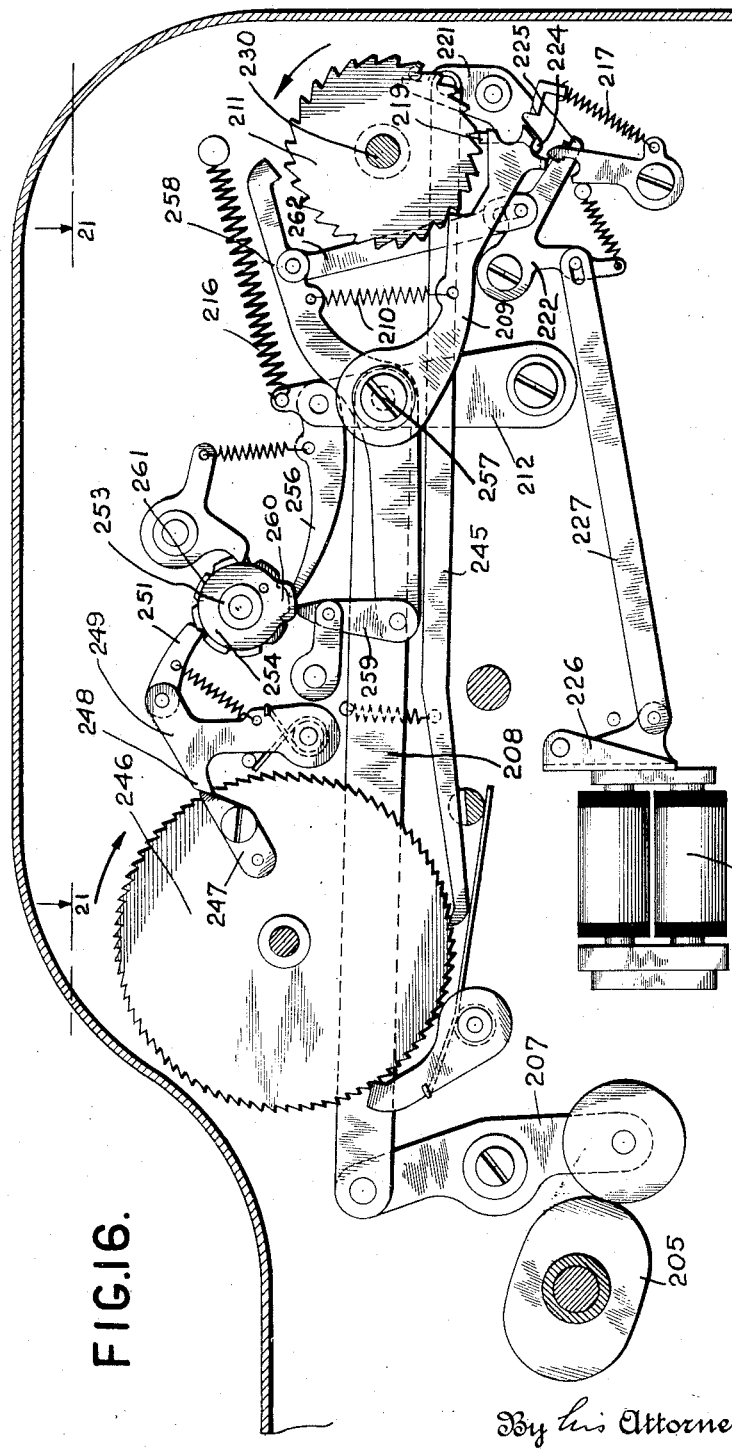
Fig. 16 is a view in side elevation of the record strip feeding devices.

If a paper spacing operation should occur at the time the pawl 209 is fully retracted, magnet 206 (Fig. 16) will be energized, attracting its armature structure 226 and through a link 227 will rock pawl 222 to disengage the shoulder 225 from the tail piece 224 of pawl 221, whereupon the latter will be rocked by its spring 217 to occupy the position shown in Fig. 16. Since lug 219 now occupies an elevated position pawl 209 will rise so that its shoulder 220 will enter a ratchet tooth. Upon a subsequent restoring movement of link 208 pawl 209 will give a step of rotation to the wheel 211 to wind the record strip by means to be hereinafter described. As the pawl 209 reaches its normal position its path of movement is such that a beveled camming edge 228 will engage a similar beveled shoulder 229 to retract pawl 221 so that it is subsequently relatched by pawl 222. Pawl 209 will then be restored to its normal relatched position as described hereinbefore.

It will be observed that the ideal operating condition for rotating the ratchet wheel is the engagement of the pawl 209 therewith when the latter is fully retracted as shown in Fig. 18. Such ideal conditions may not always be obtained due to the lack of synchronization and pawl 209 may be released when it is being restored to normal from a fully retracted position. In this instance the engaging shoulder 220 of pawl 209 may occupy the dotted line position shown in Fig. 18. The pawl 209 may then be released to engage the next ratchet wheel notch but will be ineffective to rotate the ratchet wheel. This release of the pawl 209 may occur when it is in the position shown by full lines in the diagrammatic view in Fig. 20, wherein its lug 213 is shown fully disengaged from the notch 214 of pawl 215.

Since the pawl 221 has been unlatched its lug 219 will act as a stop for the pawl 209 by coaction with the upper edge 218 of the latter, thus holding pawl 209 in such position that its lug 213 will re-engage notch 214 as pawl 209 moves to the right. As the lug 213 re-engages the notch 214, pawl 209 will have its free end drawn downwardly to the dotted line position in Fig. 20 by pawl 215 as it rocks about its pivot and the path of movement of the pawl 209 is such that the cam edge 228 will escape contact with lug 229 as shown by the dotted lines in Fig. 20. Thus pawl 221 will not be relatched during the operation in which pawl 209 is ineffective to rotate wheel 211 by reason of the delay of the energization of magnet 206. It will be understood, however, that upon the succeeding operation of a cam 205 the pawl 209 will engage the proper ratchet tooth when it is fully retracted and subsequently turn the wheel 211 to space the paper strip.

The record strip storage roller 46 is securely attached to the shaft 230 (see Figs. 5 and 8) to which ratchet wheel 211 is secured so as to suitably space the data printed upon the record strip. Retrograde rotation of the storage roll is prevented by the engagement of a pivoted pawl 231 with a ratchet wheel 232 secured to shaft 230. To likewise wind the carbon sheet so as to present a fresh portion to the printing line the carbon sheet storage roller 47 is driven by a coiled spring belt drive 233 which encircles a grooved wheel 234 secured to shaft 230 and passes around similar grooved but smaller wheel 235. The latter carries a pawl 236 biased by a flat spring into engagement with a ratchet wheel 237 which has a suitable connection to the carbon sheet supply roller 47.

It should be understood that the record strip spacings occur at the time the individual sheet 55 is between the platen roller 22 and the contacting roller 165, provided the machine is set in a manner to be subsequently explained to print one or more items on a single sheet so that if desired, one or more items may be printed on the sheet and similarly spaced.

To unroll the wound record strip it is necessary to cause the disengagement of pawl 231 from the ratchet wheel 232 and to this end the pawl 231 is pivoted upon a cross stud 242 to which is secured a finger piece 238. When the finger piece is rocked a camming pin and slot connection 239 with one arm of a bell crank lever 240 rocks the same so that a lug 241 thereof will rock the actuating pawl 209 to hold it out of any accidental or intentional interference with the ratchet wheel 211 which is rotated in a counterclockwise direction when the record strip is unwound from the storage roller 46.

Figure 4:
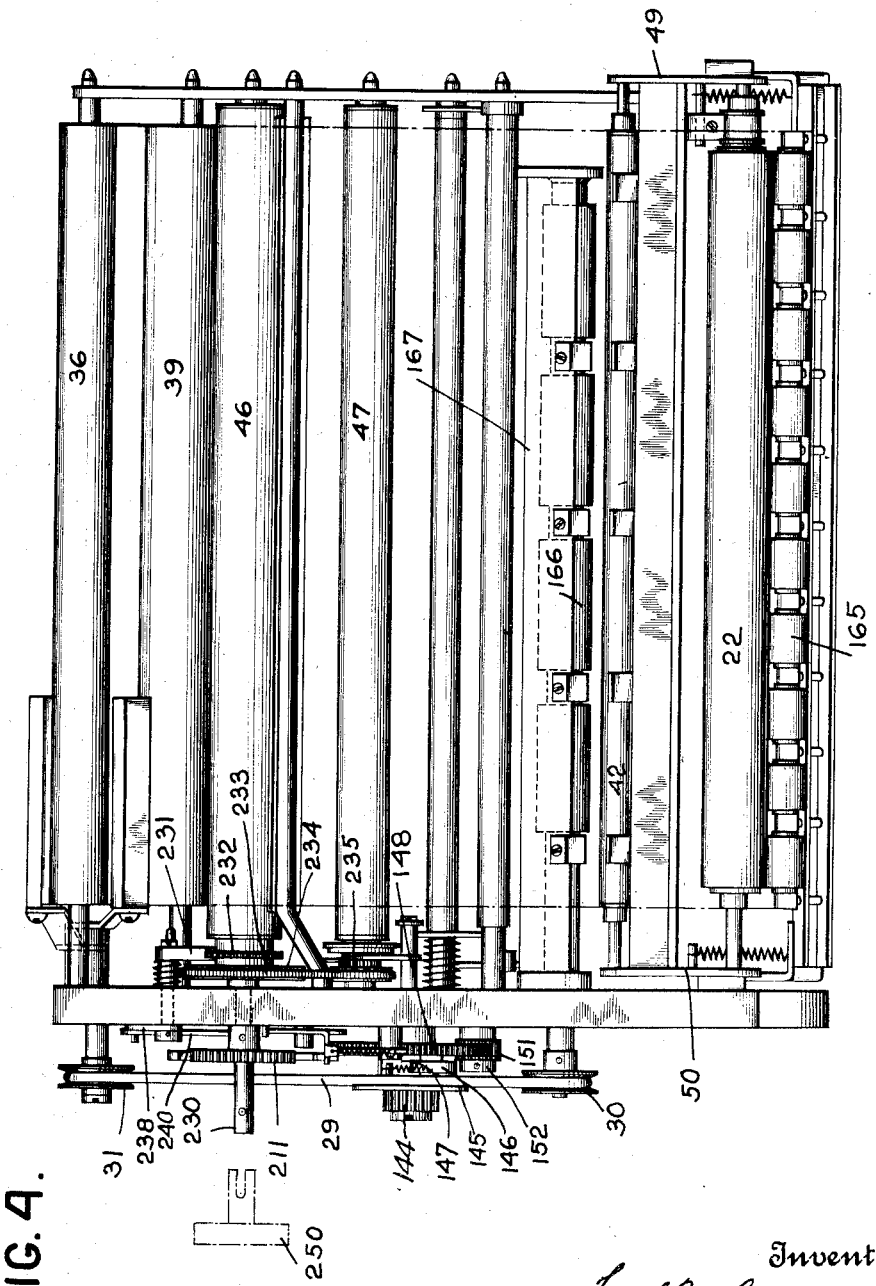
Fig. 4 is a front view of the machine, the paper strips having been removed for the sake of clearness, and is taken on the line 4—4 of Fig. 3.
Figure 17:
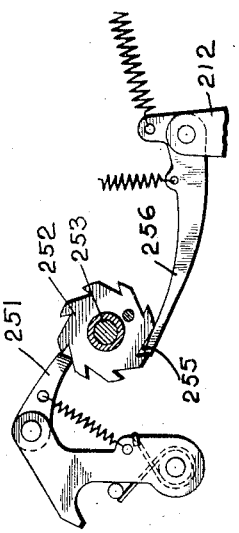
Fig. 17 is a detail view of some of the parts disclosed in Fig. 16.

It is desirable that the record strip be given an increased feed equivalent to a number of line spaces when a predetermined number of paper spacing and printing operations have been performed in order to accommodate the printed matter comprising a head space of the following part of the strip. This additional paper spacing operation may also be employed to permit manual detachment of the printed slip. To this end, the pawl 221 (Fig. 16) has pivoted thereto a horizontal pawl 245 which is urged by a spring to constantly engage the ratchet teeth of a count disk 246. To the count disk 246 there is secured an actuating plate 247. When the disk 246 is turned to a certain position, it will actuate a tail 248 of an arm 249 to initiate the additional paper spacing operation. Upon each ordinary paper spacing operation, the disk 246 is given an increment of movement by pawl 245 so that the plate 247 is successively turned from the initial position, determined by a setting handle 250, (Fig. 4) to its actuating position. When the plate 247 arrives at its actuating position corresponding to a predetermined number of imprints and paper spacing operations the arm 249 is rocked clockwise so that a pawl 251 pivoted to the arm turns a ratchet wheel 252 (Fig. 17). The ratchet wheel 252 has a sleeve connection 253 with a cam disk 254. The wheel 252 has a series of eight notches, one of which is designated by numeral 255 and is longer than the remaining seven notches. This notch 255, as shown in Fig. 17 is normally received by reciprocable pawl 256 pivoted to the extremity of arm 212 and reciprocated thereby. When the pawl 256 reciprocates in the notch 255, it is ineffective to rotate the wheel 252. But, however, when the ratchet wheel 252 is given a step of rotation by pawl 251, it will cause one of the smaller notches of ratchet wheel 252 to register with the pawl 256 so that each subsequent reciprocation of pawl 256 by arm 212 will cause the wheel 252 to be given a step of rotation which steps occur successively and until the longer notch 255 again registers with pawl 256.

Pivoted by the stud 257 which, it will be recalled, is the pivot stud of pawl 209 is a supplementary pawl 258 normally urged by the spring 210 downwardly to engage the ratchet wheel 211 but normally prevented from so doing by the engagement of an arm 259 which is pivoted to an integral extension of pawl 258, and which arm 259 normally coacts with a cam extension 260 of cam disk 254. When the initial clockwise step of rotation of the unit comprising the ratchet wheel 252 and disk 254 is effected the cam portion 260 will be brought out of engagement with the arm 259 whereupon the arm 259 by its coaction with a concentric edge 261 (Fig. 16) of disk 254 will permit spring 210 to force pawl 258 downwardly to engage the teeth of the ratchet wheel 211. The engagement of the pawl 258 with the ratchet wheel 211 will be maintained until cam extension 260 again cams pawl 258 to ineffective position. When the pawl 258 engages the ratchet wheel 211 each reciprocation of the arm 212 will cause the pawl to be shifted to the right to engage the next tooth space of ratchet wheel 211 and when the pawl is restored, it will turn the ratchet wheel 211 a step.

Connected to pawl 258 is a link 262 which has a pin and slot connection to pawl 222 so that when pawl 258 is moved downwardly to engage the teeth of the wheel 211, the pawl 222 will be operated in the same manner as if magnet 206 was energized. Thus, pawl 209 will also engage the teeth of the ratchet wheel and when the pawl 209 turns the ratchet wheel counterclockwise during the movement of the pawl 209 to the right, pawl 258 will shift to the right so that it is positioned to engage the next tooth space. As the pawl 209 is moved to the left idly the pawl 258 will by engagement with a ratchet wheel tooth turn ratchet wheel 211 in a counterclockwise direction. Thus ratchet wheel 211 is alternately turned by the pawls 209 and 258 so that both turn the ratchet wheel 211 in the same direction to additionally space the record strip, since the ratchet wheel 211 is secured to the shaft 230 which carries the record strip storage roller 46 (see Figs. 5 and 8.) In this instance the cam edge 228 will engage the lug 229 as in ordinary spacing operations, oscillating pawl 221 during each operation and by means of pawl 245 (Fig. 16) step the count wheel 246 around, the first step bringing plate 247 out of engagement with tail 248. Pawl 221 may not be relatched however by pawl 222 as long as link 262 holds the latter downwardly but upon the last paper feeding operation pawl 258 will rise and by permitting the pawl 222 to be restored to normal, the relatching of pawl 221 will ensue in a manner similar to the termination of an ordinary paper feeding operation.

Referring to the circuit diagram of the preferred wiring connections (Fig. 22) it will be observed that current from the power line 271, 272 is supplied to the motor 23 of the attachment when a switch 273 is closed. When the machine is to print a series of items upon the record strip and to thereafter space each item upon the record strip, switch 280 is opened so that contacts 274 are adapted to control the energization of the paper spacing magnet 206. These contacts are controlled by a cam rotatable by the listing shaft 15 of the tabulator to which the present improvements have been applied and which form of tabulator is fully shown and described in the Patents 1,762,145 and 1,379,268. In the machine of the patents the listing shaft 15 is operated for each item printing operation.

The circuit for causing energization of the paper spacing magnet 206 is traced as follows: from the positive side of the line 272 through closed switch 273, binder post 275, wire 276, listing shaft controlled contacts 274, wire 277, binder post 278, record strip spacing magnet 206 and by wire 279 to the negative side of the line 271. In order that each item printed upon the record strip is printed upon an individual sheet and then fed out of the machine the control switch 280 is closed. Current then flows from the binder post 278 for each listing operation through closed switch 280 to the sheet feeding control magnet 77 and thence to the negative line side 271. Thus for each item printing operation, an item is printed upon an individual sheet which is then ejected by a control effected by magnet 77.

However, when the machine is conditioned for automatic total taking operations in the manner described in the aforesaid Patents 1,762,145 and 1,379,268 with the switch 280 open, it will be observed that contacts 274 will be closed for each item printing operation, as described before, to energize magnet 206 to space the series of items printed upon the record strip. However, with a sheet 55 already presented to the printing mechanism the items will also be printed upon an individual sheet and the items concurrently spaced with the spacing of the items on the record strip. When the machine is conditioned for taking a total, total contacts 281 will be closed by the total shaft 16 thereby closing the circuit by wires 282, 283 to sheet feed control magnet 77, and in the same operation, contacts 284 which are in multiple with the contacts 274, will also be closed thereby effecting a circuit connection to energize the line spacing magnet 206 to space the last item printed upon the record strip from the total. As contacts 281 close after a total printing operation sheet feed control magnet 77 will be energized thereafter to eject the sheet upon which is printed a series of items and a total. Thus by opening of switch 280 a series of items and a total of such items appear both upon a record strip and upon an individual sheet through the medium of the transfer carbon sheet 35 (Fig. 5).

For manually controlling operation of the paper spacing and sheet feeding mechanisms, a switch member 285 is provided. Manually depressed it will be clear that with the auxiliary motor 23 running (by closure of switch 273) a circuit will be extended from binder post 275 by wire 286 through closed contacts 287 to paper spacing magnet 206 by a wire 288. The circuit by wire 286 also extends by a shunt connection 289 through closed contacts 290 and wire 291 to sheet feeding magnet 77. Thus depression of switch member 285 will result in spacing the record strip and feeding an individual sheet through the machine, when such operations are desired for initially feeding a sheet to the printing mechanism or for experimental or other purposes.

For mechanically controlling clutching of shaft 73 (Fig. 3) to feed a sheet through the machine a bell crank arm 292 is provided. One arm of said bell crank overhangs the armature structure 76 so that when rocked by pushing outwardly a slide 293 pivoted thereto, the clutch will be engaged to perform a sheet feeding operation just as if magnet 77 was energized.

To recapitulate and to more clearly understand each unitary operation of the machine the following summary is given.

Figure 3:
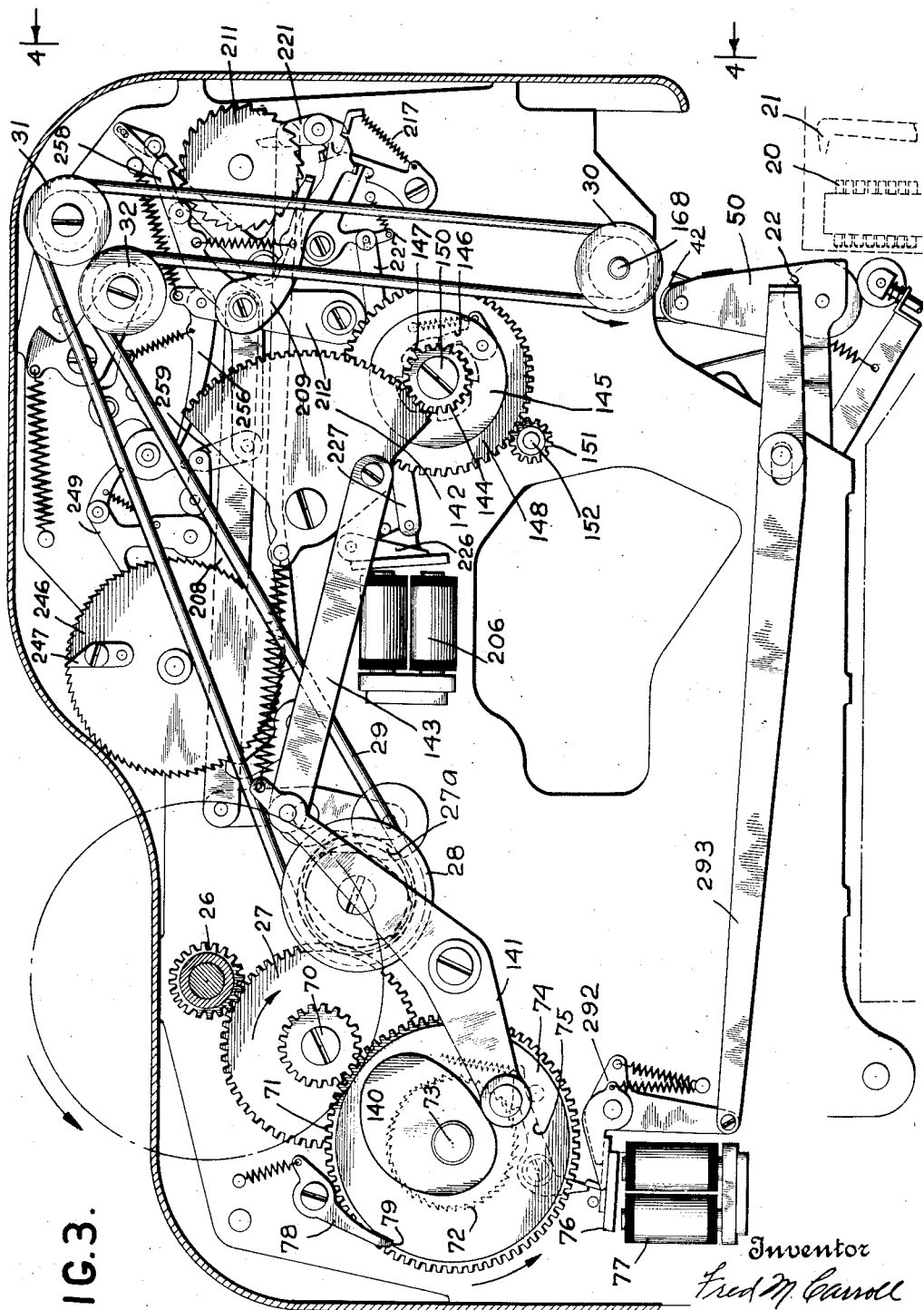
Fig. 3 is a view in side elevation of the side of the machine opposite that shown in Fig. 2.

If the machine is to be arranged to print a series of items upon a sheet 55 and also the same items on the record strip 38 the machine is operated with the auto control device plugged for operation, as explained in the Patents Nos. 1,762,145 and 1,379,268. Switch 280 (Fig. 22) is opened. The initial sheet 55 (Fig. 5) is fed to the printing mechanism by the pushing outwardly of the slide 293 (Fig. 3). The start key 5 (Fig. 23) is then depressed and item printing operations from tabulating cards performed. The type 20 (Fig. 2) differentially set and shifted by hammers 21 will print, by the usual ribbon, on the sheet 55 and by the carbon sheet 35 (Fig. 5) on the record strip 38. Each time contacts 274 (Fig. 22) close, magnet 206 is energized so that pawl 209 (Fig. 16) actuated by cam 205 will turn ratchet wheel 211 and by shaft 230 turn the record strip storage roller 46 (Fig. 5). By the spring belt drive 233 the carbon sheet 35 is shifted. The shifting of the carbon strip and record strip will turn the platen roller 22 and thus the sheet 55 carried thereby will be fed so as to space the items printed thereon.

Successive item printings occur until a total is taken determined by the automatic group control whereupon contacts 281 (Fig. 22) close, to energize sheet feed magnet 77. Contacts 284 also close to energize the paper spacing magnet 206 to space the last item printed, from the total.

As magnet 77 is energized shaft 73 (Fig. 3) is turned and cam 162 (Fig. 2) will elevate the platen roller 22 carrying the record strip, the printed work sheet and transfer sheet. When the roller 22 reaches the Fig. 14 position roller 165 engages the constantly rotating roller 166 to eject the printed sheet. When the platen is in the Fig. 15 position, suction gripper 63 (Fig. 5) picks up a sheet from the stack since the suction pump 80 (Fig. 7) gives the necessary suction, and gripper 63 feeds the sheet to rollers 125—125 (Fig. 15) which are now driven. The sheet is fed to the Fig. 15 position whereupon fingers 157 and plate 156 seize the sheet. When roller 165 contacts platen roller 22 the fingers 157 release sheet 55, and platen roller now descending presents the work sheet, transfer strip and record strip to type 20 (Fig. 2) to repeat the operation.

For printing a single item on a sheet, switch 280 is closed. No totalling is performed in such case as the automatic control is not used. Therefore list contacts 274 (Fig. 22) cause the energization of the sheet feed magnet 77 and record strip item spacing magnet 206 to perform the operations previously described.

When the machine is used to print items only as the record strip is usually composed of printed forms with a printed heading, it is desirable to skip the heading and print a successive set of items on the next form. When a predetermined number of items have been printed, pawl 251 (Fig. 16) will cause cam portion 260 to be turned so that spring 210 will cause pawl 258 to engage ratchet wheel 211, and also to cause pawl 209 to operate alternately with pawl 258 to thus turn shaft 230 and feed the record strip so that the printed heading is skipped.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention to be limited therefore only as indicated by the scope of the following claims.

What is claimed is:—

1. In a machine of the class described, an item and total printing mechanism for effecting a series of printing impressions upon a record strip, means operable for each total printing impression for feeding an individual work sheet from a supply stack so that it is in superimposed relationship with the record strip to receive a series of item imprints and a total thereof, a transfer sheet between the strip and a sheet for effecting a duplicate impression on one of them, and ejecting means operable after the operation of the item and total printing mechanism for engaging only the work sheet to eject the same.

2. In a machine of the class described, a printing mechanism for effecting a series of impressions upon a record strip and upon a work sheet, a transfer sheet between the record strip and work sheet, and means automatically called into operation only when a certain impression is effected upon both the work sheet and record strip to feed an individual work sheet from a supply stack to the printing mechanism.

3. In a machine of the class described, a printing mechanism for effecting a series of impressions upon a record strip comprising a series of items and a related total, a shaft operable during total printing operations only, means controlled by the shaft for causing the feeding of a work sheet from a supply stack partly around the record strip and to the printing mechanism, a transfer sheet for effecting duplicate impressions and means for ejecting the printed work sheet, said ejecting means being operable after the printing of the items and a total thereof.

4. In a machine of the class described, a printing mechanism for effecting item and total printing impressions, means whereby the series of items and a total are printed on a record strip, means operable when a total is printed for ejecting a printed work sheet and feeding a new work sheet from a supply stack to the printing mechanism to receive imprints comprising a subsequent series of items and a total, and a transfer sheet between the record strip and work sheet.

5. In a machine of the class described, a printing mechanism for printing items both upon a continuous record strip and an individual work sheet, a transfer sheet between the strip and sheet, a platen roller carrying said record strip, automatic means for shifting said platen roller out of correlation with the printing mechanism and thereby said strip to receive a work sheet, automatic means for separately feeding one of the work sheets from a stack to the platen roller while said platen roller is in shifted position and causing the sheet to be placed adjacent said record strip, and means for thereafter restoring said platen roller carrying both the strip and work sheet for correlation with the printing mechanism.

6. In a machine of the class described, a printing mechanism for printing a series of items upon a continuous record strip and an individual work sheet, a transfer sheet between said strip and work sheet, a platen roller normally presented to the printing mechanism and carrying said record strip, automatic means for shifting said platen roller out of correlation with the printing mechanism and to a position to receive one of the work sheets fed from a stack, means for separately feeding the work sheet from the stack and causing it to be carried by the platen roller, automatic means for thereafter restoring the platen roller carrying both the record strip and work sheet to the printing mechanism, and common means for effecting paper spacing operations to space successive imprints on the record strip and the work sheet.

7. In a machine of the class described, a printing mechanism for printing data on one of a series of individual work sheets, a platen roller, means for shifting the platen roller and restoring it to normal correlation with the printing mechanism, means for automatically feeding a work sheet separately from a stack to the platen roller while in shifted position and causing it to be carried by the roller, the restoring of the platen roller while carrying the work sheet causing its correlation with the printing position, and means other than said platen roller operable when a data printing operation has been effected for ejecing the printed work sheet from said platen roller when the latter is in shifted position.

8. In a machine of the class described, a printing mechanism, means whereby said printing mechanism prints a series of items and a total thereof both upon a work sheet and record strip, a transfer sheet between the work sheet and record strip, means effective during a total printing operation to cause the feeding of an individual sheet from a stack to the printing mechanism and in superimposed relationship with the record strip and transfer sheet, means for line spacing the series of items printed on the work sheet and the record strip, and means for ejecting the work sheet, when total printing has been completed, to a storage stack by stripping the same from the record strip and without feeding the latter.

9. In a machine of the class described, a printing mechanism and means whereby said printing mechanism prints items upon a record strip which is fed to a storage roller and a single item upon an individual work sheet fed from a supply stack, a platen roller having a fixed position when printing is effected, a transfer sheet fed to a storage roller and between the record strip and the work sheet, the latter, transfer sheet and record strip being carried by the platen roller, means for shifting said platen roller and means for thereafter feeding one of said individual work sheets from the supply stack to the platen roller, subsequent to which said platen roller is restored to present the work sheet, record strip and transfer sheet to the printing mechanism, means for rotating the transfer sheet and record strip storage rollers to line space the items on the record strip, and means other than said platen roller and operable after the operation of the printing mechanism for ejecting the printed work sheet from said platen roller.

10. In a machine of the class described, in combination, a printing mechanism comprising type bars settable to print variable data in accordance with controlling devices, a rotary platen, means for positioning, said platen means for automatically feeding a work sheet to be carried thereby, means whereby said platen carries the work sheet to the printing mechanism, and means other than said platen and automatically operated upon completing the printing operation for ejecting the work sheet from the platen, and means for causing the automatic operation of the positioning means and the automatic sheet feeding means, whereby said platen receives a succeeding work sheet.

11. In a machine of the class described, a suction device for feeding sheets separately from a stack to a pair of cooperating feeding rollers, means for driving said rollers to feed the sheet to a platen roller, means for thereafter gripping an end of the sheet fed and means for bringing said platen roller and a cooperating roller into contacting operative relationship between the sheet whereby said platen roller in its subsequent positioning carries said sheet when released by the gripping means to the printing mechanism for a printing operation.

12. In a machine of the class described, a suction device for feeding sheets separately from a stack to a pair of cooperating feeding rollers, means for driving said rollers to feed one of the sheets to a platen roller, means for thereafter gripping an end of the sheet fed, and means for bringing said platen roller and a cooperating roller into contacting operative relationship between the sheet whereby said platen roller in its subsequent positioning carries said sheet to the printing mechanism for a printing operation, and means effective after a printing operation to bring the cooperating roller out of contacting relationship with the platen roller and into contacting relationship with a continuously rotating roller whereby said sheet is ejected.

13. In a machine of the class described, means for seizing an individual sheet from a stack to present it to a pair of feeding rollers, means for driving said feeding rollers to eject said sheet beneath a pair of gripping elements whereby an end of the sheet is positively held, means for bringing a platen roller and cooperating roller into contacting relationship to grip said sheet, and means for thereafter shifting the platen roller and cooperating roller to carry said sheet to a printing line.

14. In a machine of the class described, means for seizing a paper sheet from a stack and feeding it to a gripping device which positively prevents further movement and holds an end of the sheet, means for bringing a platen roller and cooperating roller stationed at opposite sides of the sheet in contacting relationship to hold and carry said sheet, and automatic means for shifting the platen roller and the sheet carried thereby.

15. In a machine of the class described, means for seizing a paper sheet from a stack and feeding it to a gripping device which positively holds an end of the sheet, and means for bringing a platen roller and cooperating roller stationed at opposite sides of the sheet in contacting relationship to hold said sheet, the last named means being effective after the sheet is released by the gripping device to shift the platen roller to present said sheet to a printing mechanism for a printing operation.

16. In a machine of the class described, a printing mechanism, a platen roller carrying both a record strip and a transfer sheet normally presented to the printing mechanism, means for shifting said platen roller and subsequently restoring it to printing position, means for feeding an individual work sheet from a stack to said platen roller while in shifted position, and means for causing the platen roller to carry the work sheet during the restoration of the platen roller without effecting rotation of the platen roller, subsequent restoration of the platen roller positioning both the record strip, transfer sheet and work sheet to the printing mechanism to obtain duplicate imprints on the record strip and work sheet.

17. In a machine of the class described, an item printing mechanism, a platen roller carrying a record strip normally presented to the printing mechanism, means for shifting the platen roller and record strip and restoring both to printing position, means for feeding an individual work sheet to the platen roller while in shifted position and causing it to be carried by the platen roller, restoration of the platen causing the presentation of both the record strip and work sheet to the printing mechanism, a transfer sheet for the record strip and work sheet, means whereby the first imprint is received at a predetermined line of the work sheet, and means for subsequently rotating the platen roller in increments to space both the record strip and work sheet.

18. In a machine of the class described, means for effecting a series of item impressions and a total thereof upon a record strip, means for successively spacing the record strip to space said items, a supplemental means for effecting spacing of the record strip, and means set into operation when a predetermined number of impressions and strip spacing operations have been effected for additionally operating both of the strip spacing means in a plurality of steps of operation.

19. In a machine of the class described, a platen roller carrying a record strip, a ratchet wheel for rotating said platen, a pair of pawls disposed at opposite sides of the ratchet wheel for effecting rotation of said ratchet wheel, and means for causing a coaction between the pair of pawls and the ratchet wheel teeth when a predetermined number of paper spacing and printing operations have been effected.

20. An accounting machine comprising, a printing mechanism for printing upon an individual work sheet, sheet feeding means for withdrawing an individual work sheet from a supply stack and automatically operable to feed the work sheet to the printing mechanism, controlling means whereby said printing mechanism prints a total on a sheet, controlling means whereby said printing mechanism prints an item on a sheet, and common control means for causing the sheet feeding means to be automatically operative upon printing each item, or for causing the sheet feeding means to be suppressed during item printing operations and automatically operative when a total is printed.

21. In a machine of the class described, in combination, an item entering mechanism, a total taking mechanism, a common printing mechanism settable under control of both the item entering and total taking mechanism, means for feeding loose sheets singly into and out of cooperation with the printing mechanism, and common controlling means for causing the sheet feeding means to be automatically operable by the item entering mechanism or for suppressing such operation and for causing the sheet feeding means to be operable by the total taking mechanism, the latter being automatically effective after one or more automatic operations of the item entering mechanism.

22. The combination with a set of printing devices, of means for setting said devices in accordance with data on controlling records, or total representations on a totalizer by a total taking mechanism, means for feeding sheets individually from a stack into and out of cooperation with the printing devices, and a common controlling means for causing an automatic operation of the feeding means for each setting of the printing devices under control of the records, or for suppressing such automatic operation and causing the automatic operation of the feeding means by said total taking mechanism.

23. In a record controlled machine, in combination, means under control of classified records for setting a printing mechanism, automatic means for feeding a sheet from a stack to the printing mechanism, automatic means operable after the operation of the printing mechanism for ejecting the sheet from the printing mechanism, a group control device operative upon a change in classification of records, and common means for interchangeably connecting the control of both the automatic sheet feeding means and ejecting means from either the first named means or the group control device.

FRED M. CARROLL.